(12) United States Patent
Hall

(10) Patent No.: US 9,528,338 B2
(45) Date of Patent: Dec. 27, 2016

(54) PASSIVE DOWNHOLE CHEMICAL RELEASE PACKAGES

(71) Applicant: Halliburton Energy Services, Inc., Houston, TX (US)

(72) Inventor: Lee J. Hall, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 625 days.

(21) Appl. No.: 13/656,291

(22) Filed: Oct. 19, 2012

(65) Prior Publication Data

US 2014/0110102 A1   Apr. 24, 2014

(51) Int. Cl.
| | | |
|---|---|---|
| *E21B 43/25* | (2006.01) | |
| *E21B 27/00* | (2006.01) | |
| *C09K 8/03* | (2006.01) | |
| *C04B 40/06* | (2006.01) | |
| *C09K 8/467* | (2006.01) | |
| C04B 103/00 | (2006.01) | |

(52) U.S. Cl.
CPC ............ *E21B 27/00* (2013.01); *C04B 40/0633* (2013.01); *C09K 8/03* (2013.01); *C09K 8/467* (2013.01); *C04B 2103/0077* (2013.01)

(58) Field of Classification Search
CPC ...... E21B 27/00; E21B 27/02; C04B 40/0633; C04B 2103/0077; C09K 8/03; C09K 8/467; Y10T 428/1341
See application file for complete search history.

(56) References Cited

U.S. PATENT DOCUMENTS

| | | | |
|---|---|---|---|
| 2,892,405 A * | 6/1959 | Chesnut | 166/299 |
| 3,394,767 A * | 7/1968 | Terry | E21B 27/02 |
| | | | 166/100 |
| 6,279,656 B1 | 8/2001 | Sinclair et al. | |
| 6,613,720 B1 | 9/2003 | Feraud et al. | |
| 6,966,386 B2 | 11/2005 | Ringgenberg et al. | |
| 7,048,066 B2 | 5/2006 | Ringgenberg et al. | |
| 7,093,664 B2 | 8/2006 | Todd et al. | |
| 7,168,494 B2 | 1/2007 | Starr et al. | |
| 7,252,147 B2 | 8/2007 | Badalamenti et al. | |
| 7,303,014 B2 | 12/2007 | Reddy et al. | |
| 7,322,412 B2 | 1/2008 | Badalamenti et al. | |
| 7,353,879 B2 | 4/2008 | Todd et al. | |
| 7,404,440 B2 | 7/2008 | Reddy et al. | |
| 7,409,991 B2 | 8/2008 | Reddy et al. | |
| 7,451,817 B2 | 11/2008 | Reddy et al. | |
| 7,503,399 B2 | 3/2009 | Badalamenti et al. | |
| 7,621,336 B2 | 11/2009 | Badalamenti et al. | |
| 7,621,337 B2 | 11/2009 | Badalamenti et al. | |
| 7,748,452 B2 | 7/2010 | Sullivan et al. | |

(Continued)

OTHER PUBLICATIONS

Strnat, Karl. Modern Permanent Magnet Applications (1990).*

(Continued)

*Primary Examiner* — Angela M DiTrani
*Assistant Examiner* — Avi Skaist
(74) *Attorney, Agent, or Firm* — Tenley R. Krueger; Baker Botts L.L.P.

(57) ABSTRACT

An apparatus for releasing chemical agents in a well bore, comprising: a packaging material; a chemical agent, wherein the chemical agent is contained within the packaging material; and an adhesive, wherein the adhesive is attached to the packaging material and associated methods.

14 Claims, 2 Drawing Sheets

Side cross-sectional view

(56) References Cited

U.S. PATENT DOCUMENTS

| | | |
|---|---|---|
| 7,938,186 B1 | 5/2011 | Badalamenti et al. |
| 8,056,638 B2 | 11/2011 | Clayton et al. |
| 8,136,594 B2 | 3/2012 | Streich et al. |
| 2003/0057401 A1 | 3/2003 | Craig |
| 2004/0014607 A1 | 1/2004 | Sinclair et al. |
| 2004/0115378 A1 | 6/2004 | Dunaway et al. |
| 2006/0213662 A1* | 9/2006 | Creel et al. .................. 166/286 |
| 2008/0006413 A1* | 1/2008 | Le Gloahec .......... E21B 43/108 166/369 |
| 2009/0200028 A1* | 8/2009 | Dewar .................... E21B 33/16 166/286 |
| 2010/0307744 A1 | 12/2010 | Cochet et al. |
| 2011/0042081 A1* | 2/2011 | Streich et al. ................ 166/269 |
| 2011/0042082 A1 | 2/2011 | Schultz et al. |
| 2012/0247772 A1* | 10/2012 | Huang .................... C04B 28/26 166/300 |

OTHER PUBLICATIONS

International Search Report and Written Opinion issued in PCT/US2013/065439, mailed Dec. 27, 2013, 14 pages.
International Preliminary Report on Patentability issued in related PCT Application No. PCT/US2013/065439, mailed on Apr. 30, 2015 (11 pages).
Extended European Search Report issued in related Application No. EP 13846919.2, mailed on May 2, 2016 (10 pages).

* cited by examiner

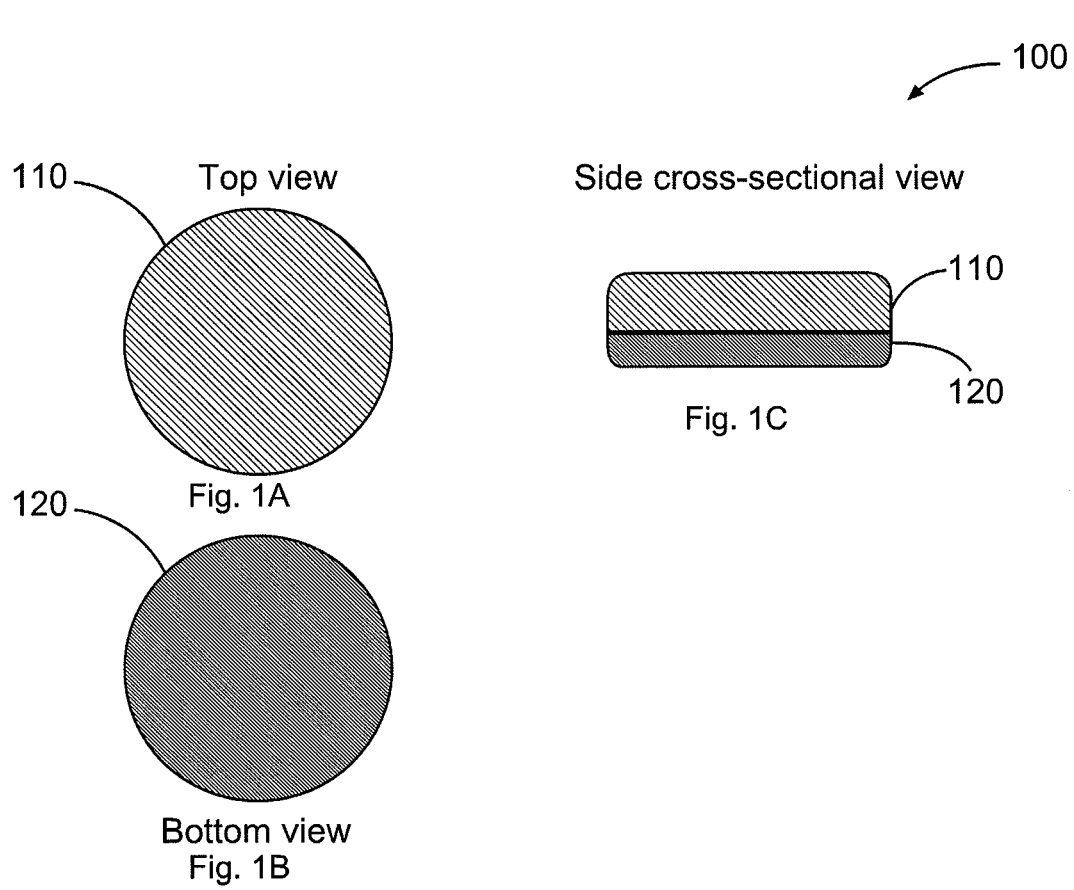

Top view

Side cross-sectional view

Bottom view

Top view

Side cross-sectional view

Bottom view

PASSIVE DOWNHOLE CHEMICAL RELEASE PACKAGES

BACKGROUND

The present disclosure relates generally to passive downhole chemical release packages and more particularly, in certain embodiments, the present disclosure relates to passive downhole chemical release packages capable of releasing chemical agents at desired locations in a well bore and associated methods.

A wide variety of chemicals may be used within a well bore in connection with producing hydrocarbons or reworking a well that extends into a hydrocarbon formation. Chemicals such as free radical initiators, catalysts (e.g. cement curing agents, gelling agents, mud-to-cement agents, etc.), lubricants, contrast agents, acid gas scavenger materials (for $H_2S$, $CO_2$, etc.), filter-cake breakers, sensors, and indicators are commonly used. Such chemicals are well known in the art.

A persisting problem in the drilling of wells is the ability to trigger chemical reactions downhole on demand. Two different flow regimes may be required to properly stage downhole reactions in a conventional operation: Laminar flow, taking place at a relatively slower rate, is needed to place the chemical of interest at a desired depth, while turbulent flow, requiring a fast pumping rate, would be needed to mix chemicals. The transient pressure changes induced by changing the pump rate of the fluids may be enough to cause undesired well bore instability. These considerations are exacerbated by the long length scale of the drillstring and the continuous flow of fluids through the drill pipe and the annulus, making it difficult to stage the mixing of any two reagents at a specified depth or location, or to initiate their desired reaction at a specified time. As a result, companies and personnel managing drilling rigs are often resistant to the practice of changing pump speeds to facilitate the requirements of drilling fluids over the course of applications.

One approach proposed in the past is to use encapsulated or otherwise protected chemicals which are added to fluids at the top of the drill string and pumped down the well bore. The encapsulating material could be tuned to degrade at a predetermined condition naturally occurring along the drillstring, which typically has gradients of increasing temperature and pressure with increasing depth. The limitation of this approach is that the encapsulated chemical could only react with other chemicals nearby in the suspending fluid, within a spatial zone governed by diffusion and turbulent mixing, or on a limited length scale.

It may be desirable to have a deployment means to release one or more chemicals into the annulus between the well bore and the casing so that the chemicals need not be pumped from the surface at the top of the well bore. Such an approach could be used to protect surface equipment such as pumps, lines, tanks, mixers, or solids control equipment from reactive chemicals.

SUMMARY

The present disclosure relates generally to passive downhole chemical release packages and more particularly, in certain embodiments, the present disclosure relates to passive downhole chemical release packages capable of releasing chemical agents at desired locations in a well bore and associated methods.

In one embodiment, the present disclosure provides an apparatus for releasing chemical agents in a well bore, comprising: a packaging material; a chemical agent, wherein the chemical agent is contained within the packaging material; and an adhesive, wherein the adhesive is attached to the packaging material.

In another embodiment, the present disclosure provides a method of delivering a chemical agent comprising: providing a downhole chemical release package, the downhole chemical release packaging comprising a packaging material, a chemical agent contained within the packaging material, and an adhesive attached to the packaging material; introducing the downhole chemical agent into a subterranean formation; and allowing the downhole chemical release package to release the chemical agent.

In another embodiment, the present disclosure provides a method comprising: providing a tubular; attached a downhole chemical release package to the tubular, the downhole chemical release package comprising a packing material, a chemical agent contained within the packing material, and an adhesive attached to the packing material; introducing the tubular into a subterranean formation; and allowing the downhole chemical release package to release the chemical agent.

The features and advantages of the present invention will be apparent to those skilled in the art from the description of the preferred embodiments which follows when taken in conjunction with the accompanying drawings. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIGS. 1A-1C illustrate top, bottom, and side views of a first embodiment of a downhole chemical release package, incorporating aspects of the present disclosure.

Figure 2A:
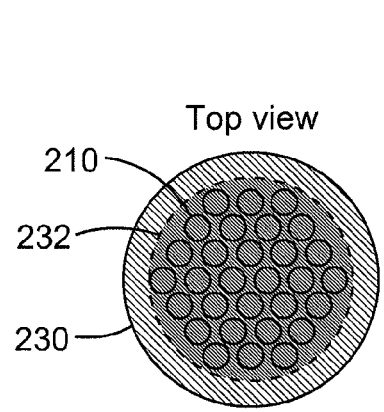
FIGS. 2A-2C illustrate top, bottom, and side views of a second embodiment of a downhole chemical release package, incorporating aspects of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to passive downhole chemical release packages and more particularly, in certain embodiments, the present disclosure relates to passive downhole chemical release packages capable of releasing chemical agents at desired locations in a well bore and associated methods.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure offers a low cost, low risk solution for staging triggered chemistry downhole using existing tubular goods infrastructure. In certain embodiments, the present disclosure describes a cheap, one time use package (or group of packages) that can be readily affixed to a drillstring without the use of special pipe or equipment. The present disclosure relates to processes of encapsulating chemicals within a degradable chemical package, affixed to a strong adhesive, which could then be attached to a drill pipe, casing, liner, or other tubular.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells.

In certain embodiments, the present disclosure provides an apparatus for releasing chemical agents in a well bore, comprising a chemical package and an adhesive. Referring now to FIG. 1, FIGS. 1A-C illustrate top, bottom, and side views of a downhole chemical dispenser 100 comprising a chemical package 110 and adhesive 120 in accordance with a first embodiment of the present disclosure.

Downhole chemical dispenser 100 may be any shape suitable for use in a tubular. In certain embodiments, chemical dispenser 100 may be disk-shape, cylindrical, conical, spherical, hemispherical, or ellipsoidal. In other embodiments, chemical dispenser 100 may have cut sections. In certain embodiments, downhole chemical dispenser 100 may be placed within a tubular or attached to a tubular.

In certain embodiments, chemical package 110 may comprise a chemical agent contained or encapsulated within a packaging material. Suitable chemical agents include any chemical agent suitable for use in a subterranean formation. Examples of suitable chemical agents include, but are not limited to, free radical initiators, catalysts (e.g. cement curing agents, gelling agents, mud-to-cement agents, etc.), lubricants, contrast agents, acid gas scavenger materials (for $H_2S$, $CO_2$, etc.), filter-cake breakers, sensors, and indicators. The chemical agent may be in any state, however condensed states such as liquids or solids are preferred due to the relatively small volume of each package. Suitable packaging materials include any packaging material that is capable of degrading downhole to release the chemical agents. For example, the packaging material may be capable of releasing the chemical agent by employing any one of the following: a polymer film or coating which dissolves in a well bore fluid (e.g. water based mud, oil based mud, or some constituent thereof); a polymer film or coating which melts at elevated temperature within the well bore; a polymer film which swells in solvent or electrolyte, thus allowing diffusion; a polymer film or coating which becomes rubbery above its glass transition temperature ($T_g$), thus allowing diffusion; a polymer film or coating which mechanically ruptures or breaks; a material which is compressed with polymer binder granules which dissolve or swell; a solid material reactant which dissolves in a well bore fluid; a solid material which is eroded or ablated away by the flow of solids-laden well bore fluids. Examples of such film-like packaging materials include but are not limited to polymer films such as polylactic acids, cellulose, or other polysaccharides, polyethylenes, polyacrylic acids, polyvinyl alcohols, urethanes, epoxies, silicones, styrenes, or copolymers thereof. Examples of suitable porous packaging materials include but are not limited to: natural and synthetic sponges, pumice, partially pyrolyzed wood, aerogels and hydrogels, fritted or otherwise sintered metals, glasses, and ceramics, cardboard, paper, and other woven or non-woven fibrous structures with porosity. The particular packing material may be tuned to degrade at a chosen range of temperature, pressure, pH, reactant concentration, or fluid velocity through prior processing.

In certain embodiments, adhesive 120 may comprise a chemical adhesive or a magnet. Examples of suitable chemical adhesives include epoxies, cellulose derivatives, isocyanates, urethanes, acrylics, cyanoacrylics, etc. Examples of suitable magnets include Nd alloy ($Nd_2Fe_{14}B$), Sm alloy ($SmCo_5$; $Sm(Co, Fe, Cu, Zr)_7$), "Alnico" alloy ($Fe-Al_x-Ni_y-Co_z$), or Sr-ferrite alloy magnets. The adhesive 120 may be attached to the chemical package 110 and to a tubular.

Figure 2C:
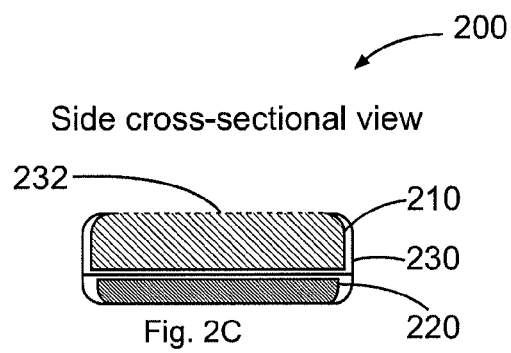
Figure 2B:
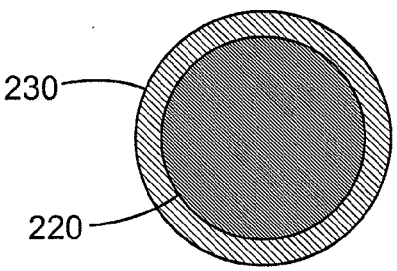

In certain embodiments, the downhole chemical dispenser may further comprise a housing. FIGS. 2A-C illustrate top, bottom, and side views of a downhole chemical dispenser 200 comprising a chemical package 210, and adhesive 220, and a housing 230 in accordance with another embodiment of the present disclosure. Downhole chemical dispenser 200, chemical package 210, and adhesive 220 may share common features with the downhole chemical dispenser 100 shown in FIG. 1.

In certain embodiments, housing 230 may comprise a top 232. In certain embodiments, top 232 may comprise a perforated top. In other embodiments, top 232 may comprise a mesh of arbitrary porosity. Housing 230 and top 232 may be made of any rigid materials. Examples of such rigid material include, but are not limited to, metals and polymers. Examples of suitable metals include sheets and screens of SAE 304 or 316 stainless steel. Housing 230 may partially or completely encase chemical package 210 and adhesive 220. In certain embodiments, housing 230 may encase downhole chemical dispensers 200 in such a manner that top 232 is positioned above the chemical package 210 and a portion of the adhesive 220 remains un-encased, as shown in FIG. 2.

Figure 3A:
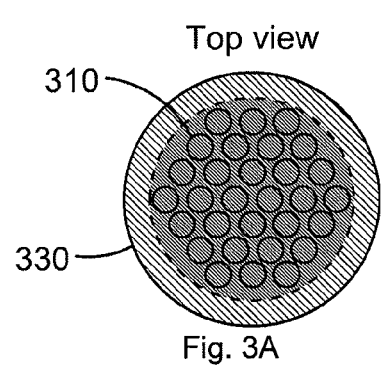
FIGS. 3A-3C illustrate top, bottom, and side views of a third embodiment of a downhole chemical release package, incorporating aspects of the present disclosure.
Figure 3C:
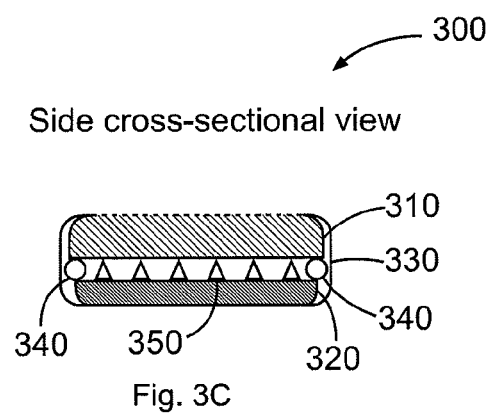
Figure 3B:
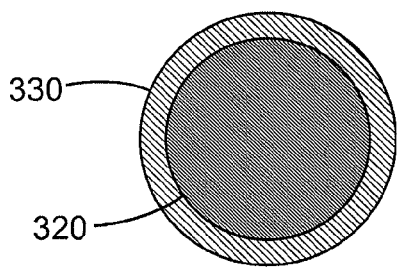

In certain embodiments, the downhole chemical dispenser may further comprise a pressure activated release mechanism. FIGS. 3A-C illustrate top, bottom, and side views of a downhole chemical dispenser 300 comprising a chemical package 310, an adhesive 320, housing 330, O-ring 340, and puncture points 350 in accordance with another embodiment of the present disclosure. Downhole chemical dispenser 300, chemical package 310, adhesive 320, and housing 330 may share common features with the downhole chemical dispensers 100 and 200 shown in FIGS. 1 and 2.

In certain embodiments, O-ring 340 may comprise any flexible material capable of maintaining an air gap. In certain embodiments, puncture points 350 may comprise any hard material such as a metal, ceramic, or a polymer. In certain embodiments, puncture points 350 may comprise ends of wires in a screen. O-ring 340 may be positioned between the chemical package 310 and adhesive 320 such that, at atmospheric conditions, an air gap is formed between chemical package 310 and adhesive 320. When under a selected pressure, the air gap formed between chemical package 310 and adhesive 320 may compress allowing the puncture points 350 to pierce the chemical package 310 to facilitate the release of a chemical agent. The selection of O-ring 340 and puncture points 350 may allow for the collapse of the air gap and the puncture of the chemical package at specific pressures.

In certain embodiments, the downhole chemical dispensers discuss herein may be used to deploy a chemical agent in a well bore at a specific reaction zone. In certain embodiments, the downhole chemical dispensers discussed herein may allow for the dispensing of a chemical agent via the degradation rate of its packaging material in the context of fluid flowing past a stationary package. In other embodiments, the downhole chemical dispenser discussed herein may be added to any section of a drill pipe and may move with the drillstring as it descends during drilling operations, regardless of the flow velocity of fluids.

To facilitate a better understanding of the present invention, the following examples of certain aspects of some embodiments are given. In no way should the following examples be read to limit, or define, the entire scope of the invention.

EXAMPLES

Example 1

Applications in Production

During production, several packages may be distributed along production casing and may be setup to release different unique tracer molecules which would correspond to different production zones. By monitoring the tracer molecular profile at the top of the well, the relative production rates of different zones may be inferred.

Example 2

Applications in Cementing

Several packages containing cement hardening accelerators could be placed on the outside of a casing and placed within a well bore. Once the cement level in the annular space reaches the package, the package could degrade on contact with the caustic pH of the cement, helping to seal the well bore.

Example 3

Applications in Scavenging

The chemical package could be a highly porous solid material incorporating an $H_2S$ scavenging material such as ZnO. In this case, the package may actually remove a hazardous chemical ($H_2S$) replacing it with water by the following equation: $ZnO+H_2S \rightarrow ZnS+H_2O$.

Example 4

Application in Well Bore Strengthening

The chemical package may be affixed to the inside or outside of a drill pipe, drill collar, or bottom hole assembly and tuned to degrade at a narrow range of elevated downhole temperatures to release a lost circulation material. Utilizing this method, lost circulation materials with strong plugging abilities would not need to be constantly re-circulated with the drilling fluid, saving wear and tear on pumps. Any unused amount returning to the surface via the annular space could still be removed from the drilling fluid with cuttings or fine solids.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. An apparatus for releasing chemical agents in a well bore, comprising:
    a downhole chemical release package, wherein the downhole chemical release package is directly coupled to a tubular and comprises:
        a packaging material, wherein the packaging material defines a top surface of the downhole chemical release package extending away from the tubular;
        a chemical agent, wherein the chemical agent is contained within the packaging material;
        an adhesive, wherein the adhesive is attached to the packaging material, wherein the adhesive defines a bottom surface of the downhole chemical release package opposite the top surface, and wherein the adhesive directly couples the downhole chemical release package to the tubular; and
    a pressure activated release mechanism, wherein the pressure activated release mechanism comprises:
        a flexible ring disposed between the packaging material and the adhesive such that, at atmospheric conditions, an air gap is formed between the packaging material and the adhesive; and
        a plurality of puncture points disposed between the packaging material and the adhesive such that, at a selected pressure, the air gap compresses to allow the plurality of puncture points to pierce the packaging material.

2. The apparatus of claim 1, wherein the packaging material comprises at least one material selected from the group consisting of: silicones, nanocelluloses, natural and synthetic sponges, pumice, wood, partially pyrolyzed wood, aerogels and hydrogels, fritted and/or sintered metals, ceramics, composite cardboard, paper compositions and combinations thereof.

3. The apparatus of claim 1, wherein the adhesive comprises a magnet.

4. The apparatus of claim 1, further comprising a housing which encases at least a portion of the packaging material and at least a portion of the adhesive.

5. The apparatus of claim 4, wherein the housing comprises a perforated top section disposed over the top surface of the downhole chemical release package.

6. A method of delivering a chemical agent comprising:
providing a downhole chemical release package, the downhole chemical release package comprising a packaging material defining a top surface of the downhole chemical release package, a chemical agent contained within the packaging material, an adhesive attached to the packaging material and defining a bottom surface of the downhole chemical release package opposite the top surface, and a pressure activated release mechanism, wherein the pressure activated release mechanism comprises:
a flexible ring disposed between the packaging material and the adhesive such that, at atmospheric conditions, an air gap is formed between the packaging material and the adhesive; and
a plurality of puncture points disposed between the packaging material and the adhesive;
coupling the downhole chemical release package to a tubular such that the top surface of the downhole chemical release package extends from the tubular, by directly coupling the adhesive to the tubular;
introducing the downhole chemical agent into a subterranean formation; and
allowing the downhole chemical release package to release the chemical agent.

7. The method of claim 6, wherein the packaging material comprises at least one material selected from a group consisting of: silicones, nanocelluloses, natural and synthetic sponges, pumice, wood, partially pyrolyzed wood, aerogels and hydrogels, fritted and/or sintered metals, ceramics, composite cardboard, paper compositions and combinations thereof.

8. The method of claim 6, wherein the adhesive comprises a magnet.

9. The method of claim 6, wherein the downhole chemical release package further comprises a housing, wherein the housing at least partially encases the packaging material and at least partially encases the adhesive.

10. The method of claim 9, wherein the housing comprises a perforated top section disposed over the top surface of the downhole chemical release package.

11. The method of claim 6, wherein allowing the downhole chemical package to release the chemical agent comprises:
compressing the air gap at a selected pressure; and
allowing the downhole chemical release package to be punctured by the plurality of puncture points.

12. A method comprising:
providing a tubular;
attaching a downhole chemical release package directly to the tubular, the downhole chemical release package comprising a packaging material defining a top surface of the downhole chemical release package, a chemical agent contained within the packaging material, and an adhesive attached to the packaging material and defining a bottom surface of the downhole chemical release package opposite the top surface, wherein the adhesive directly attaches the downhole chemical release package to the tubular such that the top surface of the downhole chemical release package extends from the tubular, wherein the downhole chemical release package further comprises a pressure activated release mechanism, the pressure activated release mechanism comprising:
a flexible ring disposed between the packaging material and the adhesive such that, at atmospheric conditions, an air gap is formed between the packaging material and the adhesive; and
a plurality of puncture points disposed between the packaging material and the adhesive;
introducing the tubular into a subterranean formation; and
allowing the downhole chemical release package to release the chemical agent.

13. The method of claim 12, wherein the packaging material comprises at least one material selected from a group consisting of: silicones, nanocelluloses, natural and synthetic sponges, pumice, wood, partially pyrolyzed wood, aerogels and hydrogels, fritted and/or sintered metals, ceramics, composite cardboard, paper compositions and combinations thereof.

14. The method of claim 12, wherein allowing the downhole chemical release package to release the chemical agent comprises allowing the downhole chemical release package to be punctured by a pressure activated release mechanism.

* * * * *